A. L. BLOOM AND E. W. CARLSON.
DRAFT CONTROLLING ATTACHMENT FOR TRACTORS.
APPLICATION FILED AUG. 7, 1920.
1,360,263.
Patented Nov. 30, 1920.
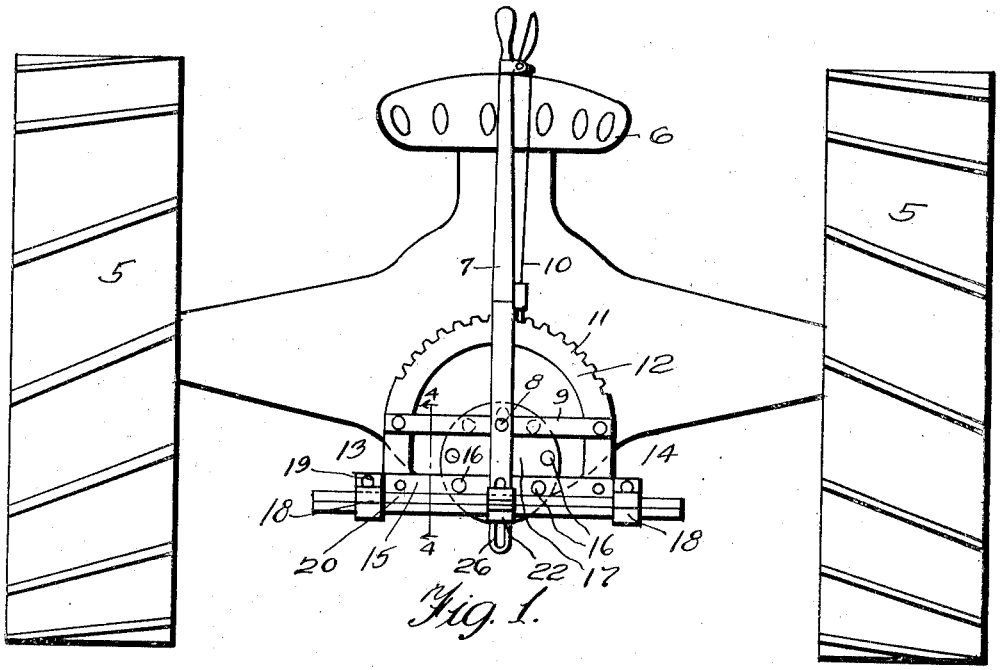
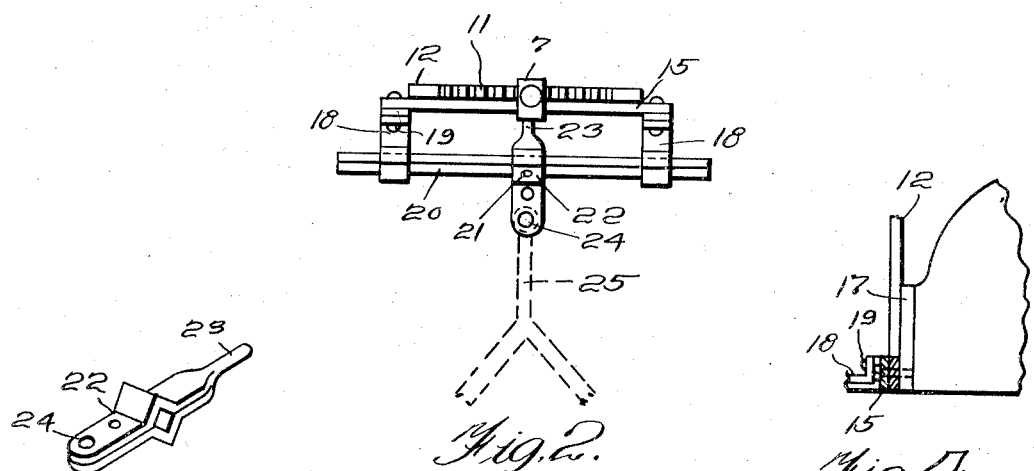
Axel L. Bloom and
Edwin W. Carlson
INVENTOR.
BY
Shepherd Campbell
ATTORNEY.

UNITED STATES PATENT OFFICE.

AXEL L. BLOOM AND EDWIN W. CARLSON, OF KIRON, IOWA.

DRAFT-CONTROLLING ATTACHMENT FOR TRACTORS.

1,360,263. Specification of Letters Patent. Patented Nov. 30, 1920.

Application filed August 7, 1920. Serial No. 401,960.

*To all whom it may concern:*

Be it known that we, AXEL L. BLOOM and EDWIN W. CARLSON, citizens of the United States, residing at Kiron, in the county of Crawford and State of Iowa, have invented certain new and useful Improvements in Draft-Controlling Attachments for Tractors, of which the following is a specification, reference being had therein to the accompanying drawings.

The invention relates to draft controlling attachments for tractors, and it has for its object the provision of a device adapted to be easily and quickly mounted, as an attachment, upon the rear end of Fordson or Sampson tractors where it serves to shift the point of attachment of the plow or other implement being drawn by the tractor in such manner that the plow may be caused to cut a full furrow in hillside work.

Further objects and advantages of the invention will be set forth in the detailed description which now follows.

In the accompanying drawing:

Figure 1 is a rear elevation of a Fordson tractor having the attachment applied thereto;

Fig. 2 is a plan view of the attachment;

Fig. 3 is a perspective view of the connection between a slotted lever and the laterally shifting element to which the plow or other implement is to be connected; and Fig. 4 is a vertical sectional view upon line 4—4 of Fig. 1.

Like numerals designate corresponding parts in all of the figures of the drawing.

Referring to the drawing 5 designates the wheels and 6 the seat of a tractor which may be the well known Fordson tractor. The attachment constituting the present invention consists of a lever 7 that is pivoted at 8 to a bar 9. This lever is provided with a latch of the well known construction as indicated at 10, which coacts with the teeth 11 of a segment 12. The hand grip of the handle 7 moves laterally across the back of the tractor and close to the back of the seat so that a driver upon the seat may easily reach the same. Side members 13 and 14 of the sector 12 are united by the bar 15 which may be engaged by some of the usual bolts 16 of the transmission case cover 17 of the tractor. Guides 18 are bolted at 19 to the bar 15 and constitute slidable mountings for a bar 20 that is rectangular in cross section. The bar 20 has pinned or otherwise secured thereto at 21, a clamp 22 the inner end of which terminates in a pin 23 and the outer end of which is provided with an opening 24; the latter serving as means for the attachment of the beam of a plow or other agricultural implement, indicated at 25. The pin 23 is disposed in a slot 26 of the lever 7 so that as the lever is moved back and forth upon the pivot 8 the bar 20 is caused to slide longitudinally in the guides 18. Thus the clamp 22 is caused to move laterally across the rear end of the tractor, while at the same time it is securely held against any twisting or turning movement. The shifting of the clamp 22 across the rear end of the tractor shifts the point of attachment of the agricultural implement with the tractor and facilitates the efficient operation of the implement, particularly in hillside work.

While we have illustrated the bar 20 as being slidably mounted in its guides, it is to be understood that the invention includes its its purview fixing this bar in its support and causing the clamps 22 to slide with respect to the bar. It is further to be understood that the invention is not limited to the precise construction set forth but that it includes within its purview whatever changes fairly come within either the terms or the spirit of the appended claims.

Having described our invention, what we claim is:

1. A tractor hitch comprising a frame having a rounded toothed upper edge constituting a segmental rack, a lever pivoted intermediate its ends centrally upon said frame and carrying a latch coacting with said rack, rearwardly projecting guides upon the frame, an angular bar longitudinally slidable through said guide and a member clamped upon said bar and projecting inwardly and outwardly therefrom, the outwardly projecting portion being formed for engagement with an agricultural implement and the inwardly projecting portion being formed to constitute a pin, the lower end of said lever being slotted for the reception of said pin and lying between said bar and the frame.

2. A tractor hitch comprising a toothed segment, rearwardly projecting guides carried thereby, a bar angular in cross section slidable in said guides, a clamp upon said bar having means for attachment of an agricultural implement thereto and having a pin projecting forwardly therefrom, a lever pivoted intermediate its end, a slot formed in the lower end of said lever with which said pin directly engages and a latch carried by the lever and operating over said segment.

In testimony whereof we hereunto affix our signatures.

AXEL L. BLOOM.
EDWIN W. CARLSON.